United States Patent
Rendon

(12) 
(10) Patent No.: US 10,947,332 B1
(45) Date of Patent: Mar. 16, 2021

(54) COPOLYMER WITH PROGRAMMABLE WATER SOLUBILITY

(71) Applicant: Timeplast, LLC, Coral Gables, FL (US)

(72) Inventor: Manuel Rendon, Coral Gables, FL (US)

( * ) Notice: Subject to any disclaimer, the term of this patent is extended or adjusted under 35 U.S.C. 154(b) by 0 days.

(21) Appl. No.: 16/913,483

(22) Filed: Jun. 26, 2020

(51) Int. Cl.
  *C08L 29/04* (2006.01)
  *C08L 23/00* (2006.01)
  *C08F 110/02* (2006.01)
  *C08L 23/26* (2006.01)

(52) U.S. Cl.
  CPC ........ *C08F 110/02* (2013.01); *C08F 2500/08* (2013.01); *C08L 23/00* (2013.01); *C08L 29/04* (2013.01); *C08L 2023/42* (2013.01)

(58) Field of Classification Search
  CPC .......... C08L 29/04; C08L 23/00; C08L 23/04; C08L 23/06; C08L 23/08; C08L 23/16; C08L 2034/42
  See application file for complete search history.

(56) References Cited

U.S. PATENT DOCUMENTS

| | | | | | |
|---|---|---|---|---|---|
| 3,997,489 | A | * | 12/1976 | Coker | C08K 5/053 524/231 |
| 5,354,804 | A | * | 10/1994 | Inada | C08J 3/03 524/502 |
| 5,389,709 | A | * | 2/1995 | Itamura | C08K 3/013 524/239 |
| 6,544,661 | B1 | * | 4/2003 | Lee | B32B 27/32 428/520 |
| 9,181,412 | B2 | * | 11/2015 | Rendon | C08J 11/105 |
| 2007/0117905 | A1 | * | 5/2007 | Toyoda | C08L 23/0853 524/487 |

FOREIGN PATENT DOCUMENTS

| KR | 10-2017-0008916 A | * | 1/2017 | C08L 29/04 |
|---|---|---|---|---|
| KR | 2017008916 A | * | 1/2017 | B65D 65/40 |

OTHER PUBLICATIONS

KR 10-2017-0008916A (Jan. 25, 2017); machine translation. (Year: 2017).*

* cited by examiner

*Primary Examiner* — Rip A Lee
(74) *Attorney, Agent, or Firm* — Sanchelima & Associates, P.A.; Christian Sanchelima; Jesus Sanchelima

(57) ABSTRACT

A copolymer composition including a method having a first step involving heating and submerging of LDPE into a heptane bath until the LDPE dissolves into the heptane bath resulting in a water-like solution. A second step including precipitating of the water-like solution forming a PE wax within the water-like solution. A third step involving filtering and distilling of the water-solution separating the PE wax from the heptane bath. A fourth step involving dispersing of the PE wax in a liquid carrier resulting in a combination. A fifth step involving polymerizing of the PE wax into LDPE by introducing the combination into PVA during an extrusion process resulting in a homogeneous mixture. A sixth step involving programming the water solubility of the homogeneous mixture. Resulting in the copolymer composition having programmable water solubility, shelf-life stability and quality in the presence of moisture or liquids for a predetermined length of time.

8 Claims, 1 Drawing Sheet

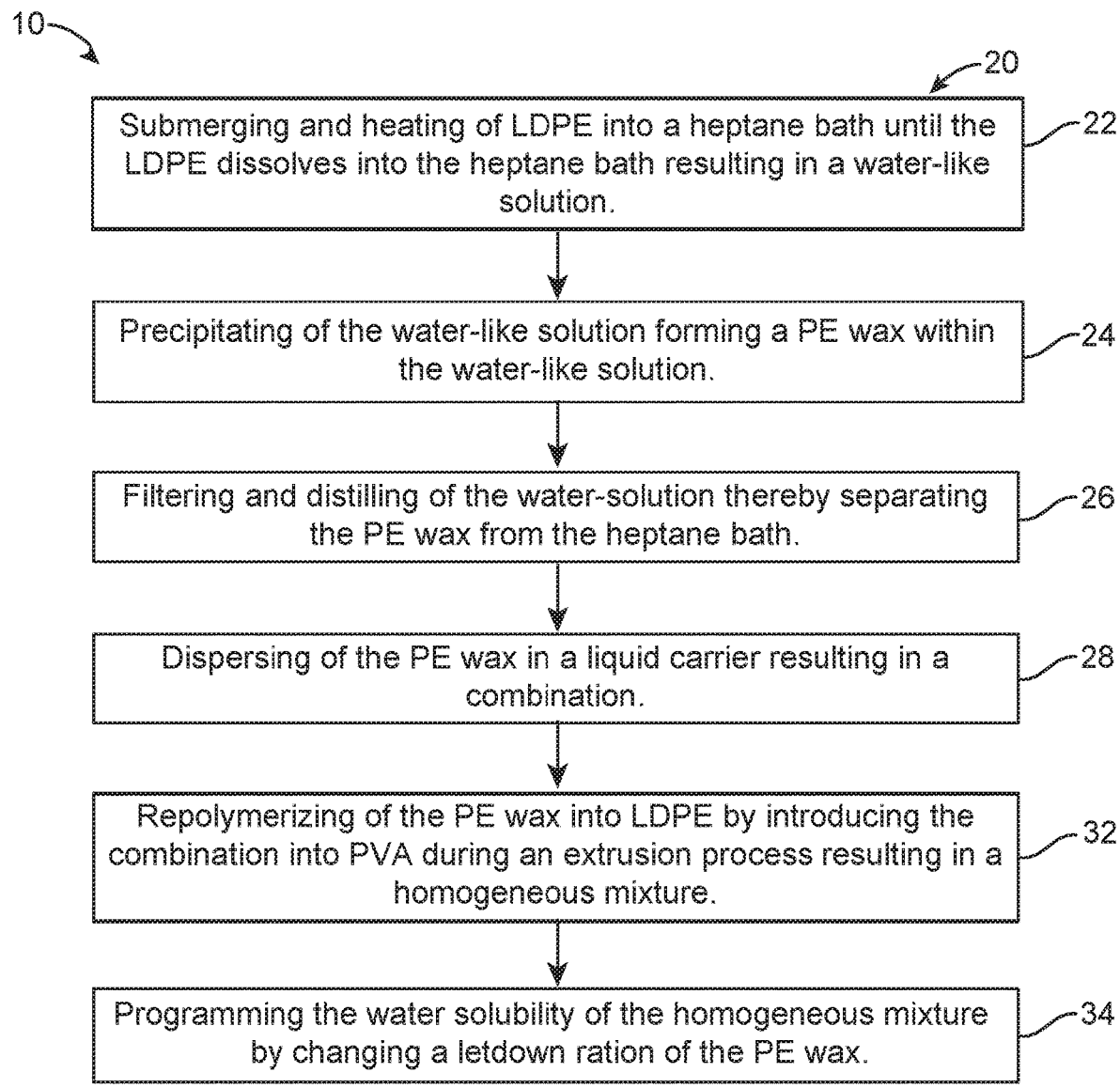

US 10,947,332 B1

COPOLYMER WITH PROGRAMMABLE WATER SOLUBILITY

BACKGROUND OF THE INVENTION

1. Field of the Invention

The present invention relates to a copolymer composition and, more particularly, to a copolymer composition having a programmable water solubility.

2. Description of the Related Art

Several designs for water soluble copolymer compositions have been designed in the past. None of them, however, include a copolymer composition that is an environmentally friendly homogeneous mixture with programmable water solubility, allowing the copolymer to maintain its shelf life stability, market-expected quality and stability in the presence of moisture or liquids for a predetermined length of time. Further, the copolymer composition's obsolescence time is manipulated through water solubility programmability by changing the amount of non-water soluble up-cycled resin in the copolymer chain, which improves the usability and functionality of the copolymer. Additionally, the copolymer composition avoids the typical miscibility issues when combing two polymers. Miscibility issues may arise when combing two polymers by molecularly disguising one of the polymers as a polyethylene (PE) wax through a previous process of depolymerization that lowers the particle size and molecular weight of low-density polyethylene (LDPE) enough to allow the for it to be homogenously mixed while maintain adequate molecular weight for it to be polymerized again into the LDPE during manufacturing, as a copolymer. The final amount of LDPE being minimal such that the majority of the copolymer composition remains water soluble and environmentally friendly.

Applicant believes that a related reference corresponds to U.S. Pat. No. 3,997,489 issued to James Newton Coker for melt extrudable polyvinyl alcohol compositions. However, it differs from the present invention because although the Coker reference uses wax to improve the extrusion process, a copolymer with improved water solubility programmability is not created in the art of Coker. Applicant believes that another related reference corresponds to U.S. Pat. No. 6,544,661 issued to Dong Kweon Lee for compositions of polyolefin and polyvinyl alcohol, films, sheets and articles processed therefrom and multilayer products using the same. However, it differs from the present invention because the majority of the copolymer created in the art of Lee is generated from the use of common plastic and not water soluble plastic, unlike the present invention. Thereby resulting in a copolymer blend that is not environmentally friendly. Additionally, the cited art of Lee does not generate a molecular multilayer or uniform copolymer like the present invention does. The lack of the uniform copolymer in the art of Lee means that the generated copolymer blend does not include the same quality of each polymer comprised thereof. The Lee reference results in a plastic blend instead of a homogeneous mixture like that of the present invention.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a copolymer composition with programmable water solubility.

It is another object of this invention to provide a copolymer composition that maintains its quality in the presence of moisture or liquids for a predetermined length of time.

It is still another object of the present invention to provide a copolymer composition that is a homogeneous and uniform.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a flowchart of the necessary steps to create a copolymer from polyvinyl alcohol (PVA) and low-density polyethylene (LDPE).

DETAILED DESCRIPTION OF THE EMBODIMENTS OF THE INVENTION

Referring now to the drawings, where the present invention is generally referred to with numeral 10, it can be observed that it basically includes copolymer composition 10 and a method 20 for creating copolymer composition.

Copolymer composition 10 preferably includes polyvinyl alcohol (PVA) and low-density polyethylene (LDPE). Each individual polymer includes characteristics that allow for successful and useful applications. The desired characteristics of PVA being water solubility. The desired characteristics of LDPE being shelf-life stability and maintaining quality in the presence of moisture. Thereby, combining the characteristics of the PVA and LDPE may be very beneficial. However, mixing of PVA with a fossil-based polymer such as LDPE proves challenging due to issues with molecular miscibility, stability and the potential for a non-homogeneous copolymer to be generated from the mixture. Hence, the present invention overcomes any such issues with method 20 which does not make use of LDPE in its fully polymerized form.

Method 20 includes a first step 22 in which LDPE is submerged into a heptane bath. It may be necessary for the heptane bath to remain at a temperature between 155° and 255° Celsius. It may be necessary for the LDPE to submerged within the heptane bath for 15 through 30 minutes. Preferably, the LDPE may remain submerged in the heptane bath until the LDPE is fully dissolved into the heptane bath resulting in a water-like transparent solution.

In a second step 24, the water-like transparent solution that results from first step 22 undergoes cooling. The water-like transparent solution will then precipitate into polyethylene wax or PE wax, a depolymerized form of LDPE. After a predetermined length of time, the PE wax will start forming at the bottom of the water-like transparent solution.

It is to be understood that the water-like transparent solution becomes a white solution after second step 24. In a third step 26, filtration and distillation to the now white solution occurs. The filtration of the white solution causes for white thicker solution to be separated from the heptane. The thicker solution may be heated at 70° Celsius, to remove any heptane still present through distillation, resulting in a very thin white powder to emerge. It is to be understood that the very thin white powder is a particular type of wax, PE wax in one instance. The PE wax may be from second step 24. The white powder helps to form a viscous cloudy liquid when molten. The very thin white powder may preferably have the particle size of a solid color pigment. This is small enough to allow the very thin white powder to be easily and homogeneously assimilated and disguised as a color additive in an extrusion process in which PVA is being used for water soluble applications, at a later step of method 20.

In a fourth step 28, the white powder from third step 26 is dispersed in a liquid carrier. The liquid carrier may be synthetic or natural with a high smoke point. The white powder being dispersed in a liquid carrier results in a combination that can be used during extrusion.

It is to be understood that the very thin white powder was importantly created to be at the verge of polymerization, by maintaining a small particle size but a high molecular weight, hence there is a need for the white powder to reach an additional melting point before being united with PVA and becoming LDPE-PVA copolymer. In a fifth step 32, the resulting combination of fourth step 28 is introduced in the extrusion process with PVA. Resulting in the polymer chain being made to accept the PE wax, disguised as a color pigment, to create a homogeneous mixture containing both, PVA and PE wax. The heat and pressure present during the extrusion process will repolymerize the PE wax or white powder into LDPE. Due to the white powder being previously forced within the PVA a copolymer matrix will result. The copolymer matrix being actual LDPE containing PVA or copolymer composition 10.

In a sixth step 34, water solubility for the resulting copolymer composition is programmed and manipulated by changing a letdown ration of the PE wax. Water solubility can be programmed as water solubility of the copolymer is proportional to the amount of PE wax used during extrusion. It may also be possible to estimate water solubility with the following function: F(LDPE)=PVA−Copolymer composition. If beginning at a letdown ratio of 0.1-0.5% of the combination from fourth step 28, a water solubility decrease of 5%-10% is achieved, but the resulting material or copolymer will remain 99.5%-99.9% water soluble. It is to be understood that for particular single use products requiring a particular shelf life, a higher letdown ration may be necessary. Despite the higher letdown ratio, water solubility will remain high to achieve a programmable shelf life, useful lifespan and a shorter environmental lifespan all simultaneously.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method for producing a copolymer composition, comprising:
   a. submerging low density polyethylene LDPE into a heptane bath and heating said heptane bath until the LDPE dissolves into the heptane bath resulting in a water-like solution;
   b. forming a PE wax within the water-like solution by precipitating the PE wax from the water-like solution;
   c. filtering and distilling the water-like solution thereby separating the PE wax from the heptane bath;
   d. dispersing the PE wax in a liquid carrier resulting in a combination;
   e. repolymerizing the PE wax into the LDPE by introducing the combination into polyvinyl alcohol PVA during an extrusion process resulting in a homogeneous copolymer mixture; and
   f. programming a water solubility of the homogeneous copolymer mixture by changing a letdown ratio of the PE wax, wherein said homogenous copolymer mixture defined as the copolymer composition.

2. The method of claim 1, wherein said heptane bath is maintained at a temperature between 155° and 255° Celsius.

3. The method of claim 1, wherein said LDPE is submerged within said heptane bath for a length of time between 15 and 30 minutes.

4. The method of claim 1, wherein the PE wax is in a form of a thin white powder.

5. The method of claim 4, wherein the thin white powder forms a viscous cloudy liquid when molten.

6. The method of claim 1, wherein said liquid carrier is synthetic or natural, said liquid carrier further having a high smoke point.

7. The method of claim 1, wherein water solubility of the homogeneous copolymer mixture is proportional to an amount of the PE wax used.

8. The method of claim 1, wherein the homogeneous copolymer mixture has a programmable shelf life and a short environmental lifespan.

* * * * *